UNITED STATES PATENT OFFICE.

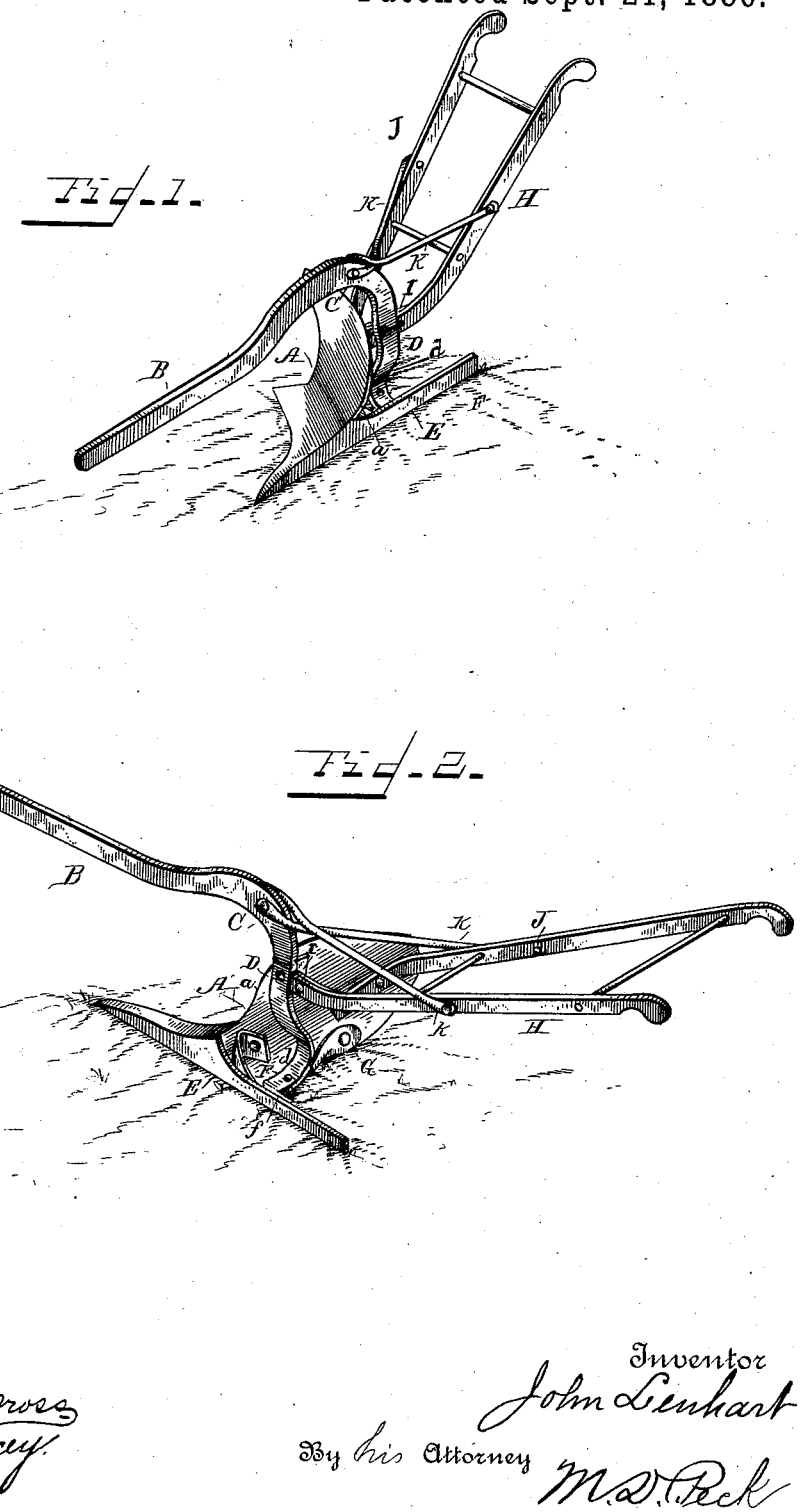

JOHN LENHART, OF FREMONT, HAMILTON COUNTY, IOWA.

PLOW.

SPECIFICATION forming part of Letters Patent No. 349,506, dated September 21, 1886.

Application filed June 4, 1886. Serial No. 204,140. (No model.)

*To all whom it may concern:*

Be it known that I, JOHN LENHART, a citizen of the United States, residing in Fremont township, in the county of Hamilton and State of Iowa, have invented certain new and useful Improvements in Plows; and I do hereby declare the following to be a full, clear, and exact description of the invention, such as will enable others skilled in the art to which it appertains to make and use the same, reference being had to the accompanying drawings, which form part of this specification.

My invention relates to that class of plows used on flat land, and has for one of its objects the construction of a mold-board so shaped and adjusted as to prevent clogging; and another object is to provide an improved construction and combination of parts of the beam and handles, whereby the plow is strengthened and dirt is prevented from clogging within the lower part of the standard or beam on the land side.

Referring to the drawings, Figure 1 is a perspective view from the front and land side, and Fig. 2 is a perspective view from the rear and land side.

Like letters of reference refer to corresponding parts in each figure of the drawings.

A represents the mold-board, which extends back from the plowshare, and is curved from front to back. Its land-side edge a is beveled from the rear to a sharp edge in front, to serve as a cutter for the sod or turf, in place of using a sharp-edged bar or colter secured to the front part of the beam of the plow.

B represents the beam, which I prefer to make of iron or steel in one piece, which is bent at its rear end, C, to form a vertical standard, D, which is secured at its lower end to the landside E and lower portion of the mold-board A. The lower part of the upright portion of the standard is bent outward and downward from the landside, until at about the same height therewith, when it is bent at d at substantially a right angle on the same plane with and toward the landside, forming an arm, F, with a depending lug, f, through which it is bolted to or otherwise secured to the landside. A right-angled piece, G, is riveted to the arm underneath thereof and to the lower part of the mold-board and rear part of the share, forming a strong brace between the land and outer side of the plow.

At about midway of the standard D the land-side handle H is secured thereto by means of a right-angled splicing-brace, I, which is riveted to the side of the handle and standard and to the mold-board of the plow.

The outer handle, J, is bent at its lower portion to conform to the curvature of the rear part of the mold-board, and is riveted thereto at near its outer edge. I prefer to make the handles of iron or steel, though they may be made of wood or other suitable material, if desired.

On the outer side of each handle there is riveted or bolted a bracing-rod, K, which extends to the rear part of the beam of the plow, where they are made to cross each other, and are so bent as to be riveted or bolted to the beam on the opposite side from their attachment to the handles.

By means of the shape and edge of the mold-board the sod and clay soil will be cut to fit its width and follow its contour until it leaves the plow and prevent the dirt clogging upon or sticking to it, and the construction of the lower vertical part of the standard being at a substantial distance from the landside all clogging of dirt about the standard and handles is prevented, the dead grass, pieces of sod, and stones that have a tendency to fall against the landside of the plow passing over the arm F and falling into the furrow behind, and thereby increasing the lightness of draft.

Having fully described my invention, what I claim as new, and desire to secure by Letters Patent of the United States, is—

A plow having a beam bent to form a standard, the lower portion of which is bent outward and downward from the landside, and extended to form a right-angled arm on the same plane with the landside, and secured thereto by a depending lug, said standard and arm being secured to the mold-board and share by the braces I and G, substantially as and for the purpose set forth.

In testimony whereof I affix my signature in presence of two witnesses.

JOHN LENHART.

Witnesses:
 A. N. BOEYE,
 H. S. KAMRAR.